July 27, 1965  D. KUPERSCHMID  3,197,078

GUIDE LINE MARKER

Filed March 21, 1963

INVENTOR.
DAVID KUPERSCHMID

ATTORNEY

United States Patent Office 3,197,078
Patented July 27, 1965

3,197,078
GUIDE LINE MARKER
David Kuperschmid, 1 Danton St.,
Huntington Station, N.Y.
Filed Mar. 21, 1963, Ser. No. 266,843
1 Claim. (Cl. 222—169)

The present invention relates to a separately mountable guide line marker attachable to devices such as lawn or field spreaders of fertilizer, seeds and chemicals.

In the past, the spreading of substances over lawns and fields, in particular, has oftentimes been a frustrating and wasteful job in that it has been difficult to ascertain which areas have already been covered. The substances spread oftentimes are obscured by falling into depths of growth, or crevices of broken earth, or such substances by their color or nature, are otherwise camouflaged, once having fallen.

In order to make certain that an entire area required to be spread with seed, lime, fertilizer or other substances, has been completely covered, it has oftentimes been necessary to very carefully examine the ground before proceeding to succeeding rows in continuation of the spreading operation in order to avoid duplication of work. Resort to the use of marking devices of the past have generally been integral parts of the spreaders themselves and not separate attachable units which may be attached to a variety of spreading devices.

According to the present invention, a simple, inexpensive, and easily attached line marking guide adapted to be affixed to various spreaders is provided which marks a guide line on the ground which can be followed by the operator of the spreader so that the operator can be reassured that an entire area is completely covered, quickly and without duplication of the spreading operation over areas already covered. A guide line marked by the present invention allows interruption and/or, if desired, reduplication of the spreading operation or work without the danger of omission or wasteful duplications, since the guide lines provided by the marking device of the present invention leaves a visible record of what areas have already been covered by the prior spreading operation. Briefly, the guide line marker of the present invention comprises, inter alia, a hollow enclosure having a tapered lateral surface and access means for disposing a marking substance within the enclosure. A plurality of apertures are predeterminedly arranged in and substantially at the wide terminus of the lateral surface from which the substance emanates in the marking operation. Means are provided for detachably mounting the hollow member to the wheel and axle assembly.

Although such novel feature or features as are believed to be characteristic of the invention and are pointed out in the claim, the invention and the manner in which it may be carried out, may be further understood by reference to the description following and the accompanying drawings.

Referring now to the figures in greater detail, like reference numbers denote like parts in the various figures.

Figure 1:
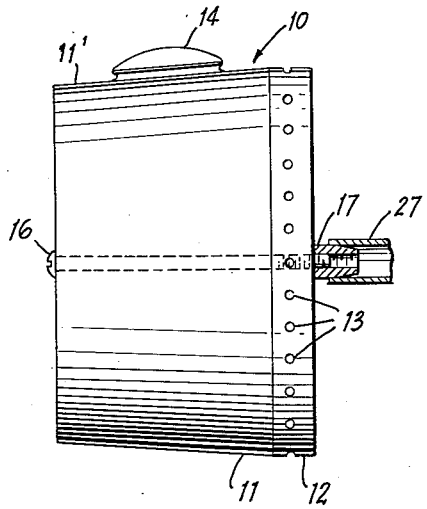
FIG. 1 is a side elevation of an embodiment of the guide line marker of the present invention attached to a hollow axle, partly cut away, of the wheel of a spreading device.
Figure 3:
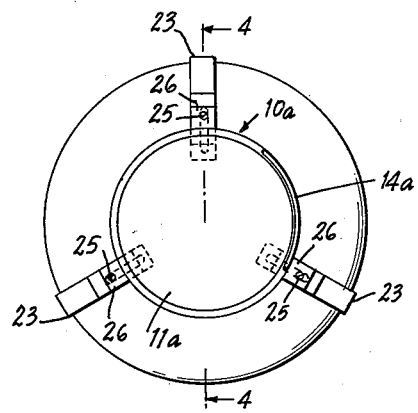
FIG. 3 is a front elevation of another embodiment of the guide line marker of the present invention attached to the outer rim of the wheel of a spreading device.
Figure 4:
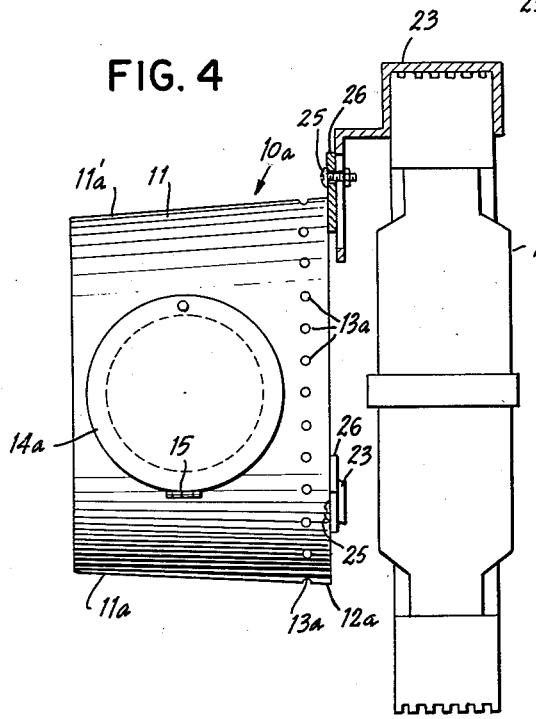
FIG. 4 is a side elevation of the guide line marker 1 taken along the line 4—4 of FIG. 3.

The guide line marker 10, 10a, as shown in FIGS. 1, 3 and 4, has a hollow body 11, 11a, having tapered inner surface 11′ and 11a′ and is generally in the form of a frustum and preferably a frustum having a circular cross section such as a cone or hemisphere type, or, alternatively, may be in the form of a hemisphere or cone. Along the base 12, 12a of the frustum body 11, 11a, i.e., at the wide terminus of the surface 11′, 11a′, are a series of spaced openings 13, 13a.

The hollow body 11, 11a is adapted to receive internally a marking substance such as, for example, a white powder such as lime.

Access to the hollow portion of the body 11 for allowing the admission of the marking substance, is obtained through access means, such as, for example the removable snap-on cap 14, shown in FIG. 1, or the hinged cap 14a and associated hinge 15 as shown in FIG. 4.

As illustrated in FIG. 1, the guide line marker 10 has a bolt 16, passing entirely through the body 11 and is adapted to be screwed into the base of anchor 17 or otherwise attached thereto. The anchor 17 is preferably in the form of a truncated cone, the narrow end of which is adapted to fit easily into a hollow axle as explained hereinafter.

Figure 2:
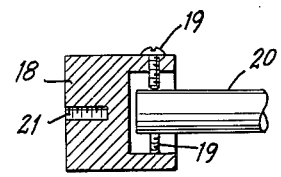
FIG. 2 is a partial side elevation of an alternate attaching means for attaching the guide line marker of FIG. 1 to a solid axle.

In FIG. 2, a straddle anchor 18 is shown affixed by screws 19 with a solid axle 20 extending from the wheel of a spreading device. The bolt 16 may be attached to the anchor 18 to hold the body 11, 11a into the threads 21, or of course the bolt may be integral to the anchor.

The guide line marker 10a as shown in FIGS. 3 and 4 is attached to the wheel 22 of a spreading device by the cleats 23. The cleats 23 fit over the periphery of the wheel 22 and have adjustment slots 24 to adjust the cleats 23 to the size of wheel 22. The guide line marker 10a by the adjustment of the cleats 23 may be both centered and adapted for various size wheels. The cleats 23 are attached to the guide line marker 10a by suitable means shown, for example, as the nut and bolt assembly 25 connected to the flanges 26 which may be integral with or otherwise affixed to the body 11a.

In operation, a separately provided guide line marker 10 may be installed in the hollow axle 27 of a spreading device by the expedient of hammering the anchor 17 into the hollow axle where the tapered walls of the anchor 17 form a wedge and thereby grip the axle 27 tightly. The bolt 16 passing through the body 11 may then be tightened into the anchor to hold the body 11 in place. Once so affixed, the guide line marker 10 is adapted to rotate parallel to the wheel 22 of a spreading machine or device. By opening the cap 14 and with a funnel or other device the body 11 may be filled with some bright, generally pulverized, marking substance. The rotation of the wheel causes the powder in the body 11 to be deposited on the ground or other surface in small amounts as it falls through the openings 13, thus making a marked line on the ground over which the guide line marker 10 passes. The guide line marker 10 is removed by unscrewing bolt 16 from the threads of anchor 17. Anchor 17, if desired, may remain in the axle 27, or may be removed, for example, by extending a long slender bar, pipe or the like, through the other hollow end of the axle 27 and in coaction with a hammer utilized to punch out the anchor 17. Alternatively, the anchor 17 may be affixed to the axle 27.

An alternate means of affixing the guide line marker 10 to the axle of a spreading device is shown in FIG. 2, where the anchoring device 18 is adapted to ride astride the projecting axle 20 of a spreading device wheel.

Of course the anchoring means may be integral with the bolt 16 or other means adapted to support the body 11 at the point where it is attached to the rotating axle. The straddle anchor 18 may also be affixed to a hollow axle.

In FIGS. 3 and 4, the body 11a is centrally attached to a wheel 22 by use of adjustable cleats 23 which snap over the circumference of the wheel 22 of the spreading device. For most normal purposes the cleats 23 do not cause sufficient loss of traction of the wheel 22 or pose any problems.

Because of the aforementioned form of the body 11, the tapered wall of the body 11 in operation always provides a slope tending to slide or move the marking substance towards an opening 13, located at the wide end of the tapered body 11, and which is nearest to the ground. In this way a more complete utilization of the marking substance and conformity of its distribution is provided.

As the spreading device is used, the marking device drops the marking substance thereby forming a guide line by which the wheels of the spreading device may be aligned by the operator of a spreading device as a guide for covering an area without missing any part thereof and/or without providing wasteful overlap.

Figure 5:
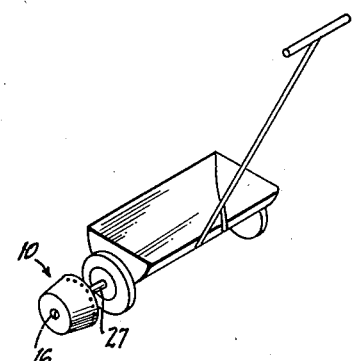
FIG. 5 is a perspective view illustrating a spreader utilizing a guide line marker of the present invention.

While the cone or hemispheric type of frustum has been used to illustrate the shape of the present invention, it is apparent to the skilled in the art that the same end objective might be achieved by any shape such as a tetrahedral form with openings placed at a peripheral portion so that the internal walls form a down slope to cause the marking substance to flow or move, especially during rotation towards these openings. Furthermore, it is to be understood that as illustrated in the drawings, the wide end of the body 11 or 11a is preferably disposed at the appropriate axle 20, 27 or the wheel 22 for the purposes of efficient dynamic loading, cf. the guide line marker and spreader of FIG. 5; however, as is obvious to those skilled in the art, the narrow end of the body 11 or 11a can also be displaced nearest to the axle or wheel without departing from the scope of this invention.

The terms and expressions which are employed are used as terms of description, it is recognized, though, that various modifications are possible within the scope of the invention claimed.

I claim:

A guide line marker adapted to be utilized with a spreader device having at least one wheel and axis assembly, said marker comprising a hollow enclosure member having a tapered lateral inner surface symmetrically disposed about the longitudinal axis of said hollow member, access means for disposing a marker substance with said hollow member, a plurality of predetermined spaced apertures disposed in and at wide terminus of said tapered surface to provide emanation of said substance from said enclosure member whenever said guide line marker is operative, and a detachable coupling means; said coupling means comprising a plurality of cleat members adjustably coupled to the wide end of said hollow enclosure member and adapted to engage the periphery of said wheel to a predetermined portion of the wheel end at the assembly of said spreader device.

References Cited by the Examiner

UNITED STATES PATENTS

| 140,046 | 6/73 | Jones | 222—171 X |
|---|---|---|---|
| 236,528 | 1/81 | Allen | 222—171 |
| 2,598,851 | 6/52 | Spevak | 301—43 |
| 2,717,807 | 9/55 | Kapp | 301—1 |
| 3,030,544 | 4/62 | Zamboldi et al. | 287—126 |
| 3,079,049 | 2/63 | Barnhard | 222—169 |

FOREIGN PATENTS 247,888    1926    Great Britain.

ROBERT B. REEVES, *Acting Primary Examiner.*
LOUIS J. DEMBO, *Examiner.*